A. B. CADMAN.
FLEXIBLE SHAFT.
APPLICATION FILED APR. 15, 1913.
1,167,381.
Patented Jan. 11, 1916.
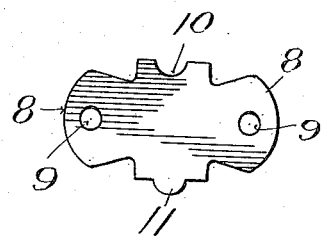
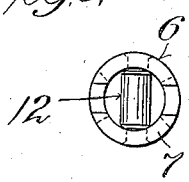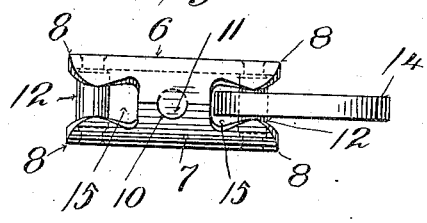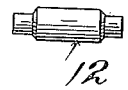
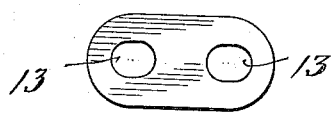
Witnesses:
C. W. Benjamin
W. A. Darby
Addi Benjamin Cadman Inventor
By his Attorney
Samuel E. Darby

UNITED STATES PATENT OFFICE.

ADDI BENJAMIN CADMAN, OF BELOIT, WISCONSIN, ASSIGNOR TO STEWART-WARNER SPEEDOMETER CORPORATION, OF BELOIT, WISCONSIN, A CORPORATION OF VIRGINIA.

FLEXIBLE SHAFT.

1,167,381. Specification of Letters Patent. Patented Jan. 11, 1916.

Application filed April 15, 1913. Serial No. 761,163.

*To all whom it may concern:*

Be it known that I, ADDI BENJAMIN CADMAN, a citizen of the United States, residing at Beloit, county of Rock, State of Wisconsin, have made a certain new and useful Invention in Flexible Shafts, of which the following is a specification.

This invention relates to flexible shafts, and particularly to flexible shafts of the pivoted link type.

The object of the invention is to provide a construction of flexible shaft link which is simple, efficient, economical to manufacture, and strong and durable in use.

A further object is to provide a flexible shaft of the nature referred to wherein provision is made for so locking the sections composing individual links of the shaft as to prevent relative endwise movement thereof, thereby preventing undue wear and breakage under the twisting strains to which such shafts are subjected in use.

Other objects of the invention will appear more fully hereinafter.

The invention consists substantially in the construction, combination, location and relative arrangement of parts, all as will be more fully hereinafter set forth, as shown in the accompanying drawing, and finally pointed out in the appended claims.

Referring to the accompanying drawing, and to the various views appearing thereon,—Figure 1 is a view in plan of a blank shaped to the required outline to form a link section or part, in accordance with the principles of my invention. Fig. 2 is a view in plan of a completed link, constructed in accordance with my invention, and showing a plate employed to pivotally connect up adjacent links. Fig. 3 is an end view of the link. Fig. 4 is a side view showing a connecting plate for the links. Fig. 5 is a view showing a rivet employed for coupling the sections of the link and also the intermediate connecting plates to the link.

A link for a flexible shaft constructed in accordance with my invention is composed of two similarly shaped and formed sections suitably connected together at their ends by transverse rivets which not only hold the sections together but also afford means for connecting the links together flexibly through intermediate connecting plates. Since, in use, a flexible shaft of the nature referred to is required to receive and resist twisting strains, it is important to provide means whereby the two sections composing the individual links are so connected or interlocked together, and preferably at their meeting edges, when assembled to form the link, as to prevent the relative endwise movement thereof, thereby relieving the rivets of strains which might break them or cause the same to be wrenched from the one or the other of said link sections.

It is among the special purposes of my present invention to provide a structure of flexible shaft link wherein these desirable results are attained.

In carrying out my invention, I form the shaft links of two sections 6, 7, respectively. In Fig. 1 I have shown a developed plan of one of these sections. It is provided with the end portions 8, through which are formed the rivet holes 9. On one edge of each plate is formed a locking recess or seat 10, and on the other edge thereof a locking projection or extension 11, shaped similarly to the recess or seat 10. The two plate sections, similarly shaped and formed, as above described, are then bent or curved transversely thereof so as to be fitted together, edge to edge, to form a cylindrical body, the locking projection or extension 11 on the edge of the one section being interlocked with or received in the seat or recess 10, on the abutting edge of the other section. Rivets 12, are fitted at their ends into the holes 9 at the ends of the assembled sections to hold said sections in assembled relation, said rivets also passing through elongated openings 13, in the ends of intermediate plates 14, which are designed to pivotally connect together the proximate ends of adjacent links to form the complete shaft.

The meeting edges of the link sections are so shaped that when assembled together an undercut opening 15 is formed at each end of the completed link, the ends of the coupling plates 14, being received in said undercut openings. By this construction I am enabled to avoid binding of the parts while the shaft is in use, and at the same time secure the desired flexibility of the shaft.

By reason of the projections or extensions 11 fitting into or engaging the seats or recesses 10, on the abutting edges of the link sections it will be seen that the sections are locked together against relative endwise movement under the twisting strains to which the shaft is subjected in use, and since this interlocking engagement of the sections of the link take any strains imposed, tending to shift said sections endwise relative to each other, the rivets are relieved of such strains which might otherwise cause the links to be broken, or sheared at their ends from the sections.

It will be understood that while I have shown a specific structure embodying my invention, I do not desire, in the broadest scope of my invention, as defined in the claims, to be limited or restricted to the exact structure shown.

But having now set forth the object and nature of my invention, and a construction embodying the principles thereof, and having described such construction, its purpose, function and mode of operation, what I claim as new and useful and of my own invention, and desire to secure by Letters Patent is:—

1. A flexible shaft link composed of sections each section having a semi-cylindrical body and an extension at each end thereof, said sections being assembled with the semi-cylindrical bodies thereof meeting edge to edge, and rivets connecting together corresponding end portions.

2. A flexible shaft link composed of sections each having a semi-cylindrical body and an extension at each end thereof, said sections being assembled with the semi-cylindrical bodies thereof meeting edge to edge, the said meeting edges inter-locking with each other, and rivets connecting together the end extensions of said sections.

3. A flexible shaft link composed of sections each having a semi-cylindrical body and an extension at each end thereof, said sections being assembled with the semi-cylindrical bodies thereof meeting edge to edge, said end extension being shaped to form an undercut opening therebetween when said sections are assembled, and rivets connecting together said end extensions.

In testimony whereof I have hereunto set my hand in the presence of the subscribing witnesses, on this 31st day of Mar. A. D. 1913.

ADDI BENJAMIN CADMAN.

Witnesses:
C. C. SULLIVAN,
S. HUDSON.

Copies of this patent may be obtained for five cents each, by addressing the "Commissioner of Patents, Washington, D. C."